United States Patent

Van Swearingen

[11] 3,952,484
[45] Apr. 27, 1976

[54] LAWN MOWER
[76] Inventor: Earl C. Van Swearingen, 5714 Driftwood Parkway, Cape Coral, Fla. 33904
[22] Filed: May 14, 1974
[21] Appl. No.: 469,880

[52] U.S. Cl. .................................. 56/202; 56/320.2
[51] Int. Cl.² ........................................ A01D 35/22
[58] Field of Search .............. 56/202, 320.2, 13.3, 56/13.4

[56] References Cited
UNITED STATES PATENTS

| | | | |
|---|---|---|---|
| 3,199,277 | 8/1965 | Moody | 56/202 X |
| 3,624,989 | 12/1971 | Gatheridge | 56/202 |
| 3,722,192 | 3/1973 | Corbett | 56/202 |
| 3,777,461 | 12/1973 | Giraud | 56/202 |

Primary Examiner—Louis G. Mancene
Assistant Examiner—J. N. Eskovitz

[57] ABSTRACT

A lawn mower of the horizontal rotary grass cutter type equipped with an ordinary plastic trash bag in a removable and replaceable manner for receiving cut grass and immediately releasing combined air therefrom.

1 Claim, 9 Drawing Figures

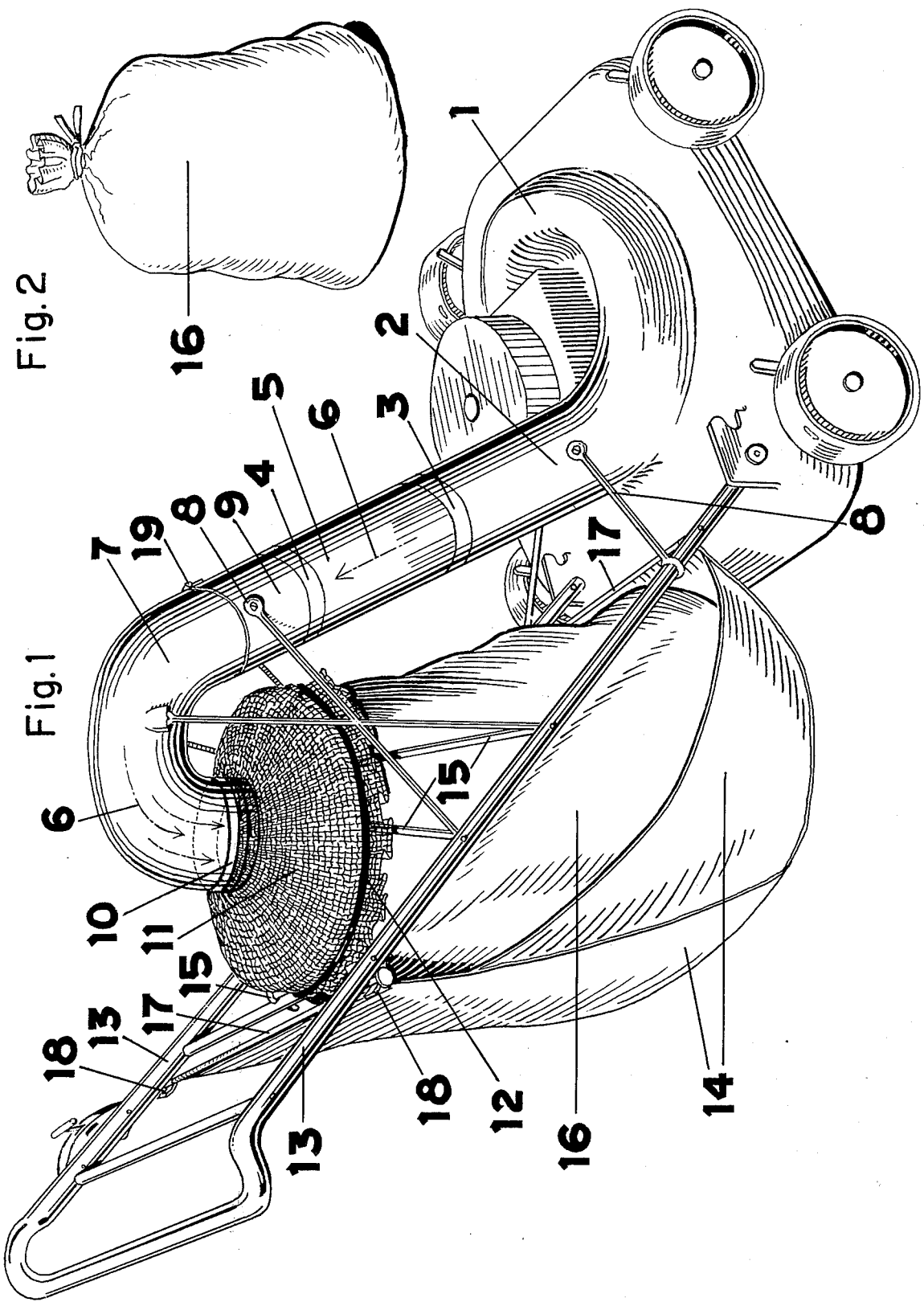

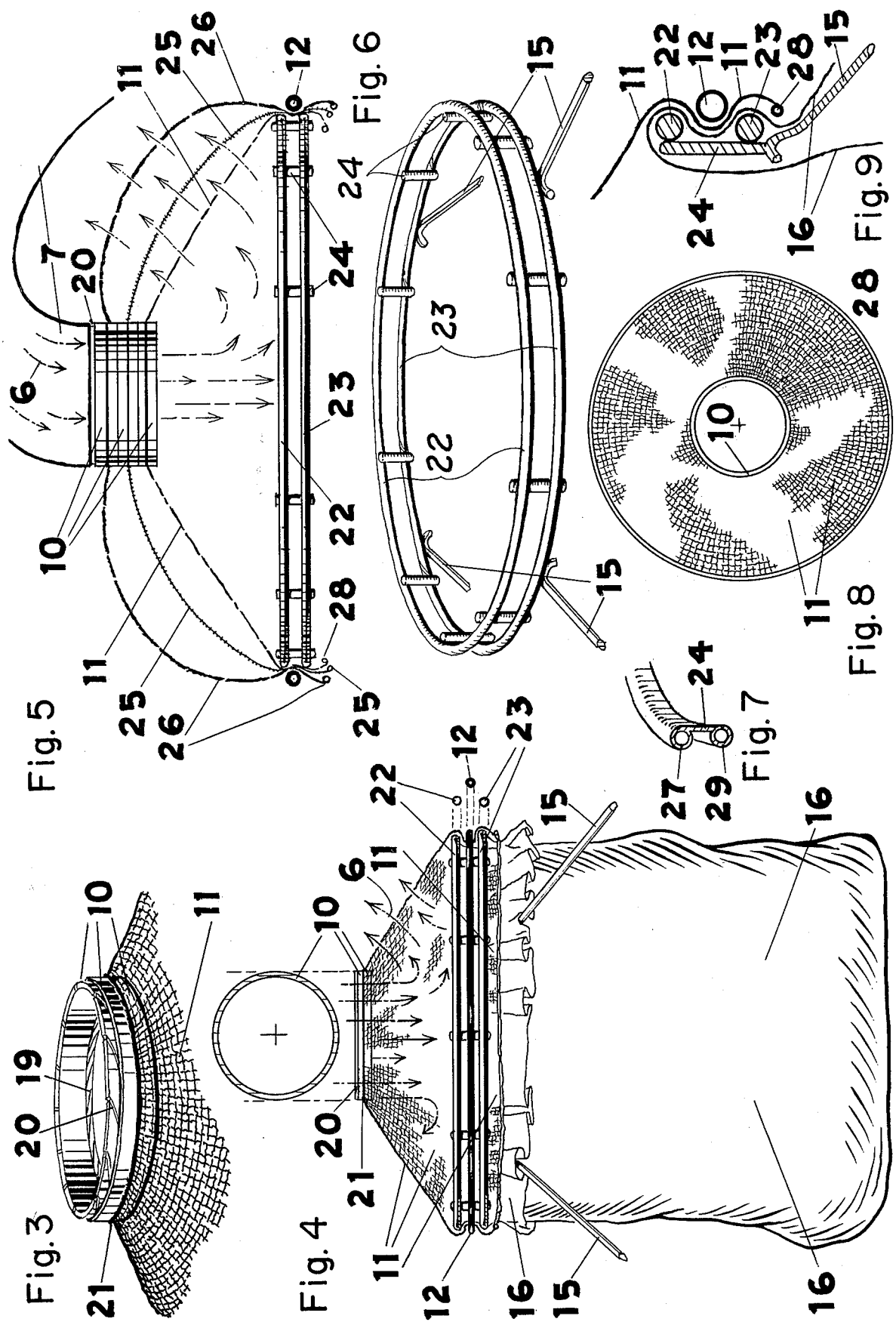

LAWN MOWER

My invention eliminates the need for taking grass that has been cut by a lawn mower of the horizontal rotary grass cutter type and transferring this cut grass to a trash bag before it can be disposed of as garbage.

Transferring cut grass from one receptacle to another takes needless time and is a waste of human effort. My invention avoids the need of this time consuming job that is usually a customary procedure after the cutting of grass or weeds by means of this particular type of grass cutting device. I effectively accomplish this aim, without attempting to market any new or special type of plastic bag, by utilizing the well known type of disposable plastic trash bag commonly found in almost any supermarket.

In the drawings:

FIG. 1 is an overall side view of my improved lawn mower of the horizontal rotary grass cutter type with my ordinary disposable plastic trash bag attached thereto with means for releasing immediately the air combined with the grass as the grass is being cut and temporarily stored in said trash bag.

FIG. 2 is my ordinary trash bag filled with cut grass and weeds and properly sealed, ready to be directly disposed of as garbage.

FIG. 3 shows the means whereby my air releasing device is attached to my improved lawn mower.

FIG. 4 is a side view with parts cut away of the general assembly of my ordinary trash bag with its air releasing device removably attached thereto.

FIG. 5 is a detailed view of the action of the air releasing device as it is removing the air combined with cut grass and weeds as the grass and weeds after being cut are being received and stored within my ordinary trash bag.

FIG. 6 is a perspective view looking down slantwise at the holding ring that is used for holding the trash bag and simultaneously holding in position the air releasing device.

FIG. 7 is a cut sectional detail of an alternate type of holding ring for holding an ordinary trash bag (plastic bag) and air releasing device, similar to that shown in FIG. 6.

FIG. 8 is a plan view of my air releasing device.

FIG. 9 is a sectional view of the manner by which the trash bag and the air releasing device are combined and attached to my improved lawn mower in an easily removable manner.

In FIG. 1 I show at numeral 1 a horizontal rotary grass cutter type of lawn mower. The following is a list of all the numerals, and what they represent as shown in all of the nine figures of the drawings combined.

1. The rotary type lawn mower with the ordinary disposable plastic grass bag attached. 2. Grass blower tube as part of lawn mower. 3. Band attaching added section of blower tube 5 which can be removed for cleaning and can be made of transparent sheet plastic to observe the action of the grass and air inside blower tube 5. 4. Band attaching blower tube sections 5 and 7. 5. Removable blower tube section that can be made transparent to observe the cut grass on its travel toward the plastic bag receiver, and that can be removed for cleaning out 7 and 2 when necessary. 6. Arrow showing direction of air and cut grass which is cut and blown by the rotary power motor cutting blade which also acts like a powerful fan and blower. 7. Top blower tube, could be made of heavy plastic, but also might be made of metal. 8. Support for top blower tube. 9. Support brace for mower handle. 10. Exit ring of metal or plastic which can screw, or be attached by any other method, onto top blower tube 7 and also have female threads at bottom side to receive a second or more exit rings. I refer to them as exit rings because this is the last ring or rings that the cut grass passes through before the tube pressure is released and grass is blown and drops by gravity into the disposable plastic bag. Attached to Exit ring 10 is an air release filter 11. 11. Air release filter which can be made of window screen material plastic screen, cloth or plastic fibre that will filter and that the air will flow through freely. 12. A holding device which could be a heavy rubber band, to fit around a hoop or other supporting device for a disposable plastic bag of the ordinary type. This holding device holds the air release filter 11 tightly around the disposable grass holding bag. 13. Handle of power lawn mower. 14. Support for the disposable bag 16. This support may be of any strong material. It is attached to the mower handle by rods 17 and 17. Canvas, cloth or sheet plastic is its preferred material. 15. Supports for holding device 12 and hoop separaters, see FIG. 6. 16. Disposable flexible, paper, cloth, or plastic bag for the cut grass but which is preferably a conventional plastic trash bag. 17. Rods attached to the mower handle to which is attached the support 14 for the disposable plastic bag. 18. The ordinary plastic bag filled with cut grass and cut weeds tied at its top and ready to be disposed of as garbage. 19. An alternate device for attaching the air releasing screen (or screens) to the top blower tube 7. 20. Threads for attaching the device 19 to the inside of grass tube (blower tube) 7. 21. Attachment material or device, which may be epoxy resin or a metal ring or gasket for attaching air release filter 11 to exit ring 10. 10 is a side elevation of exit ring 10. 22. Top supporting hoop for disposable plastic grass bag. 23. Lower supporting hoop. 24. Hoop attachments between hoops on which holding device 12 supported between and around the hoops. 12. Holding device (in this case a rubber ring) which holds disposable grass bag 16 and the air release filter 11 on supporting hoops 22 and 23, being held in place by hoop attachments 24. 12a, 22a, and 23a, show cross sections of 12, 22 and 23. In FIG. 5 the three numerals marked 10 show the three exit rings all attached together. 11a shows a cross section line of 11 attached to exit ring 10 and further attached to hoops 22 and 23 by holding device 12 shown in cross section as 12a. 25a shows a cross section line of a second air release filter which is similar to the air release filter 11, but of a material with smaller air escape holes to prevent any small debris or dirt from being blown about. 26a. Shows the cross section line of a third air release filter, if necessary when mowing over grass and sand areas, or dirty grass which would be similar to or with smaller air exit holes than the material used in 25a. More filters may be added but for most mowing only two filters should be necessary. Notice that 11 (11a) fits rather tight between exit ring 10 and top supporting hoop 22. The second air filter 25a fits less tight and the third air filter 26a fits less tight than 25a. This allows for a dust collection space between 11a and 25a and between 25a and 26a. FIG. 6 shows the support rings 22 and 23 welded together by the hoop attachments 24. It also shows how the supports 15 can be attached to hoop 23. 27. This shows a section of the supporting rings if and when made and held together as one piece. 27a. This shows a cross section comparable to the cross sections of 22 and 23 held together by 24a (or by 28) on which would ride the holding device 12 (also shown as 12a). FIG. 8 is a plan view looking down on the air filter 11 with the exit ring 10. The elastic 28 to hold the air filter in place is around the air release filter 11. The elastic 28 is to hold the air filter 11 over the supporting hoops rather firmly in place before the holding device 12 is stretched and put in place. In fact a second elestic holding device may be employed, both holding devices being between hoops 22 and 23, one to hold the plastic bag in place, the other elastic ring to hold the air filter in place. In FIG. 5 numerals 28, 25a, and 26a show cross section of the elastic band (or ring) which is around the outer edge of air filters. FIG. 9 shows the plastic disposable bag 16 in its cross sectional view 16a, and air filter 11a fitting over the cross section of the hoops 22a and 23a and being held in place by holding device 12 shown in cross section as 12a. 24a shows a cross section of the hoop attachments. 28a shows a cross section of elastic 28 as in FIG. 9.

In FIG. 1 I show my improved lawn mower resting on four wheels as many other lawn mowers of this horizontal rotary grass cutter type do. It can be pushed and guided by handle 13 as other lawn mowers are. My lawn mower may also be a mower where the person mowing sits on and rides with the lawn mower, so for this reason my displosable ordinary plastic bag may be placed over or around any part of the lawn mower where it may be handy and convient. While it can take any position while attached to a lawn mower, I prefer a vertical or nearly vertical attachment with a bag holding device like the handle 13 and the bag holding means 14 as shown in these drawings. The full scope of my invention clearly includes an improved lawn mower on which a person can ride as well as the type of lawn mower where the person guiding it walks behind it and holds the handle to guide it.

Ascending from the rotary grass cutter housing 2 is cut grass delivery tube 7. This carries the forced air and the cut grass and weeds up through elbow 7 into the trash bag 16 while air designated by numeral 6 is being simultaneously released from the cut grass and weeds through screen 11 fastened temporarily to trash bag 16 by means of trash bag holding ring composed of hoops 22 and 23 connected by elements 24 welded to them as shown in FIG. 6. A comparatively straight section of tube 5 is removeably fastened to tube 2 and tube 7 by fasteners 3 and 4. Arrows 6 in tubes 5 and 7 show directional flow of air and grass through these tubular portions of my improved lawn mower.

The elbow portion of tube 2 is herein shown as numeral 7, which in this case is fastened to the lawn mower by arched rodlike holding means 8 welded or otherwise fastened to the sides of the lawn mower handle 13.

Handle 13 also has attached rods 15, 15 and 15 fastened to each side of handle 13, these rods marked 15 holding a substantially horizontal positioned trash bag holding ring the details of which are shown in FIG. 6 but are not fully shown in FIG. 1. Fastened to the turned down portion of elbow 7 at numeral 10 is my air releasing mesh means 11 that is also connected circumfirentially and temporarily to trash bag 16. As my improved lawn mower cuts its grass and weeds and blows them up through housing 2 and through tube 5 and elbow 7 the grass is combined with air coming from the grass cutting air fan. This air, of course, must be promptly disposed of. The contained air releases itself from the grass and weeds as it enters the trash bag 16. The air comes up and out through the air screen or mesh 11. This mesh 11 may be either a single mesh or a plurality of meshed surfaces as clearly shown in FIG. 5 . . . see numerals 26, 25 and 11, all as previously referred to. Cross rods 17 and 17 hold the bag sling (or support) 14 in its proper position on my improved lawn mower.

FIG. 2 shows my plastic trash bag, 16, tied at the top filled with grass and weeds and ready for its disposal as garbage.

In FIG. 6 I show my retaining ring for holding the plastic bag 16 and the mesh screen air releasing means 11 all as previously described. In FIG. 6 the holding rods 15 shown in FIG. 1 as being attached to the lawn mower handle 13 are here shown as they are welded to the hoop 23. While I do not want to infer that my trash bag cannot be held in other than a vertical or near vertical position, in this present embodiment of my invention I prefer to use the handle 13 as the supporting means for my hoops 22 and 23. In the case of my motor driven lawn mower where the person cutting grass rides on top of the mower, I prefer to use a handle like structure similar to the structure herein to hold up hoops 22 and 23 in their substantially horizontal position and hold the rods 17 and 17 also in a similar manner as they are here being held by the guiding handle of this present showing. In the case of the motor driven lawn mower of my improved type the lawn mower handle like element would be rigidly fastened to the cutter housing 2 whereas the handle in my present drawings is also incapable of having its angle altered as the lawn mower is guided by the person walking behind it.

Of course it is possible to have my hoops 23 and 22 in some other shape beside a circular shape. They may be square polyagonal or circular as they are herein shown. In any case they have to be best fastened to my lawn mower in my improved manner as it is here shown and described. They also have to carry the bag and the air release mesh element as that is also here illustrated in order to perform in a practical fashion. As previously noted the upturned handle elements here may be permanently and immovably fastened to my power driven motored improved lawn mower housing numeral 2, because there will be no handle needed on the motor driven design of my improved lawn mower here in detail more completely described.

In the present design of my improved lawn mower, because handle 13 is used to hold all the items that connect with hoops 22 and 23 I likewise prefer that the handle be immovable in any forward or back previous possible movement. In this respect (with its immovable handle in the back of the mower) my improved mower differs from most of the lawn mowers of this type now on the market. But this does not alter the possibility, on one of my still more improved lawn mowers with a moveable handle, having two other upturned tubes positioned at an angle like the handle herein and carrying all the elements that are now handle 13 attached.

FIGS. 1, 3, 4, 5, 8 and 9 all show clearly how my mesh element 11 and my bag element 16 are held in place by hoops 22 and 23 and elastic band 12 (shown in cross section in FIG. 4 as 12a).

FIG. 9 shows particularly in a detailed cut away sectional view how this same mesh member 11 is tightly though temporarily fastened around plastic bag 16 by means of elastic band 12a (shown more fully in FIG. 4 as numeral 12).

The upper arrows in FIG. 4 show the direction of the grass and weeds combined with air coming into the zone where the entrained air begins to be released from the grass and weeds, and as the arrows are shown turning upward, where the entrained air leaves the cut grass and weeds and leaves the mowing machine out through screen 11 (and the other screens 25 and 26 if these are also being used.). The arrows pointing downward (in FIG. 5) point the path of the grass and weeds after some of their combined air has been lost and they (grass and weeds) are on their way into bag 16. This is also illustrated in FIG. 4 in further detail with a portion of part 11 cut away on the drawing.

To be more specific, one method of holding mesh member 11, and also additional mesh members 25 and 26 are to employ ring members 10, 10, and 10 which have internal threads (not shown) which screw around external threads (not shown) on tube bend 7. Another means and method of holding screen member 11 to tube bend 7 is to employ ring 19 carrying external thread 20 that can mesh with internal threads on tube 7 (these are also not shown herein). In any case the fastening between bend 7 and the filters 25, 26 and 11 are of a substantially permanent character, whereas the fastening of these same filter mesh elements to the substantially horizontal bag holding ring (22, 23, 24) is temporary and only while the plastic bag is in use receiving its flow of grass and weeds.

When the bag 16 is filled with grass and weeds and the air combined with it is substantially gone (out through the mesh) elastic member 12 can be loosened and lifted thus disengaging the mesh 11 from the retaining rings and permitting the removal of the bag filled with the cut grass and weed material (ready after tying at its top, for final disposal). The retaining ring is now free to receive a new plastic trash bag, and this is slipped down into its place. The mesh is slipped over it all the way around the retaining ring (elements 22, 23 and 24) and the elastic band 12 is snapped into place over the mesh 11 and the top of the bag 16 the cross section of which is shown in detail in FIG. 9.

It will be apparent with my improved lawn mower construction whether it is applied to a lawn mower with a fixed positioned handle as it is herein shown, or whether it is applied to tubular elements separate from the handle (but fastened at their lower extremities to the cutter housing 2, whether my improved lawn mower takes a rear handle guidance design where the operator walks behind it or where the operator rides on top of it and steers the lawn mower where it has to go, in any of these various instances my improved lawn mower has certain definite construction characteristics the interelated and interdependent combinations of which are herein adequately described and explained. That I am offering herein an entirely new and different type of lawn mower is abundantly obvious to even the most casual observer, that carries out the objects, of my invention, the saving in time and trouble ordinarily incident to the bother of a double transference of cut grass and weeds after their cutting has taken place. Since this is the main purpose I had in view in making my several improvements herein, it wll be seen that my objects are well achieved in my present improved lawn mower invention, as fully described and claimed herein.

The entire scope of my invention is amply set forth in the attached claims.

I claim:

1. An improved lawn mower of the rotary cutter type having a rotary cutter housing, handles to guide said lawn mower, said handles attached to and projecting upwardly from said rotary cutter housing, a substantially horizontal circular bag holding frame attached to said handles, a cut grass elevating tube carried by said rotary cutter housing, said tube curved near its upper grass outlet end to deliver cut grass substantially vertically downward into a cut grass circular bag recepticle, a circular air release mesh surrounding and attached to said tube and attached to said circular bag holding frame and fastening means fastening said circular mesh and said circular bag to said circular bag holding frame, said elevating tube extending upwardly above said air release mesh and curved downwardly with its outlet end entering said air release mesh substantially centrally therein.

* * * * *